(12) United States Patent
Caplan

(10) Patent No.: US 6,799,847 B2
(45) Date of Patent: Oct. 5, 2004

(54) SLIDING BRIDGE EYEGLASS FRAME

(75) Inventor: Charles H. Caplan, Middleton, WI (US)

(73) Assignee: Kerr Corporation, Orange, CA (US)

( * ) Notice: Subject to any disclaimer, the term of this patent is extended or adjusted under 35 U.S.C. 154(b) by 422 days.

(21) Appl. No.: 09/741,598

(22) Filed: Dec. 18, 2000

(65) Prior Publication Data

US 2002/0131015 A1 Sep. 19, 2002

Related U.S. Application Data

(60) Provisional application No. 60/171,145, filed on Dec. 16, 1999.

(51) Int. Cl.⁷ .................................................. G02C 5/04
(52) U.S. Cl. ......................... 351/128; 351/133; 351/158
(58) Field of Search ................................ 351/124, 128, 351/133, 140, 158, 41; 2/445

(56) References Cited

U.S. PATENT DOCUMENTS

| | | | |
|---|---|---|---|
| 1,197,742 A | 9/1916 | Kellner | 359/744 |
| 1,395,822 A | 11/1921 | Hastings | 359/399 |
| 1,507,111 A | 9/1924 | Erfle | 359/744 |
| 1,647,107 A * | 10/1927 | Franchini | 351/128 |
| 1,851,579 A | 3/1932 | Hixon | 359/411 |
| 1,910,460 A * | 5/1933 | Boutelle | 351/128 |
| 1,923,566 A * | 8/1933 | Baker | 351/128 |
| 2,389,428 A * | 11/1945 | Glasser | 351/128 |
| 3,273,456 A | 9/1966 | Feinbloom | 88/57 |
| 3,438,689 A | 4/1969 | Wehr | 350/42 |
| 3,936,152 A | 2/1976 | Aurin et al. | 350/202 |
| 4,070,098 A | 1/1978 | Buchroeder | 350/198 |
| 4,278,330 A | 7/1981 | Buchroeder | 350/411 |
| 4,364,645 A | 12/1982 | Feinbloom | 351/204 |
| 4,498,743 A | 2/1985 | Feinbloom | 351/45 |
| 4,555,164 A | 11/1985 | Feinbloom | 350/420 |
| 4,557,567 A | 12/1985 | Azumi et al. | 350/427 |
| 4,621,283 A | 11/1986 | Feinbloom | 358/93 |
| 4,820,035 A * | 4/1989 | Kanda | 351/128 |
| 4,863,468 A | 9/1989 | Feinbloom et al. | 623/6 |
| 4,865,438 A | 9/1989 | Wada | 351/158 |
| 4,929,075 A | 5/1990 | Eliakim | 351/158 |
| 5,076,682 A | 12/1991 | Pasfield | 351/158 |
| 5,090,796 A | 2/1992 | Feinbloom | 351/158 |
| 5,129,717 A | 7/1992 | Feinbloom | 351/158 |
| 5,196,028 A | 3/1993 | Portney et al. | 623/6 |
| 5,278,695 A | 1/1994 | Gebelein et al. | 359/419 |
| 5,291,229 A | 3/1994 | Feinbloom | 351/57 |
| 5,381,263 A | 1/1995 | Nowak et al. | 359/411 |
| 5,394,272 A | 2/1995 | Kvamme et al. | 359/744 |
| 5,463,500 A | 10/1995 | Buchroeder | 359/744 |
| 5,627,690 A | 5/1997 | Caplan et al. | 359/362 |
| 6,183,081 B1 * | 2/2001 | Ono et al. | 351/124 |

FOREIGN PATENT DOCUMENTS

| | | | | |
|---|---|---|---|---|
| DE | 561 572 | | 9/1932 | |
| GB | 2 166 887 | * | 5/1986 | 351/128 |

* cited by examiner

Primary Examiner—Huy Mai
(74) Attorney, Agent, or Firm—Wood, Herron & Evans, LLP

(57) ABSTRACT

A sliding bridge eyeglass frame provides salespersons and customers the ability to insure that a proper interpupillary distance between telescope oculars is achieved during a fitting session. The demonstration frame device of the present invention includes first and second bridge portions which are slidably and reversibly fixedly attached to thus allow a customized fitting for particular customers. Once proper interpupillary distances are achieved, the first and second frame members are secured together such that proper dimensions and configurations can be obtained for production of a final product.

3 Claims, 3 Drawing Sheets

SLIDING BRIDGE EYEGLASS FRAME

RELATED APPLICATIONS

This application claims priority from U.S. Provisional Patent Application No. 60/171,145 filed on Dec. 16, 1999. The entire disclosure of the provisional application is considered to be part of the disclosure of the accompanying application and is hereby incorporated by reference.

FIELD OF THE INVENTION

The present invention is directed to a sliding bridge for eyeglasses, and in particular, for magnification viewers worn by surgeons and dentists.

BACKGROUND OF THE INVENTION

Magnifying lens systems are typically used by surgeons and dentists in performing precision work. Magnifying lenses are often either directly attached to eyeglass lenses themselves, or are affixed to the eyeglass frame using a support means. Various examples of such lenses can be found in U.S. Pat. Nos. 5,463,500 to Buchroeder; 5,381,263 to Nowak et al.; 5,076,682 to Pasfield and 5,090,796 to Feinbloom.

Despite the great usefulness of such telemicroscopic instruments, the precise fitting of such instruments for particular individuals is problematic. A typical interested customer is often provided with a demonstration model of one particular magnifying spectacle and asked to close one eye so that he/she can attempt to gain an appreciation of the magnifying ability of one particular lens system. At present, however, it is not possible for an interested customer to easily perceive an image using both eyes through the demonstration magnifying spectacles. Customers are therefore deprived of the ability to view the three dimensionality and depth of field characteristics which form the basis for their desire for such magnifying spectacles in the first place. Moreover, given the inability to view through two magnifying lenses simultaneously, many customers are ultimately dissatisfied when their telemicroscopic instruments when they are manufactured and finally arrive. Often times such customers are disappointed when they finally view a magnified image and for the first time are able to appreciate the particular field of vision they are afforded. In such cases, customers complain that the field size is not acceptable for the particular individual or the resolution is not deemed adequate and/or the depth of field is not as desired. In brief, a customer for magnifying spectacles cannot assess and judge the fundamental characteristics of the device they are purchasing and as a result, significant time, effort and monies are wasted by the consumer, as well as the manufacturer, in correcting such magnifying spectacles to suit the customers needs.

There is a long felt but unsolved need for a simple and expedient method and device for custom fitting of potential customers of telemicroscopic instruments such that the customer can properly view the desired depth of field, 3D resolution and field characteristics of a desired magnifying spectacle device.

SUMMARY OF THE INVENTION

The present invention is directed to a method and device for permitting potential customers of telemicroscopic lenses to be fitted properly such that the customers ultimate telescopic glasses are precisely designed to fit their face, and in particular, to insure that their purchased glasses have the proper interpupillary distance between telescope oculars. The present invention finds particular use in the fitting of fixed "through the lens" telescope ocular systems. In such systems, the telescope ocular devices are permanently affixed to the eyeglass lens itself. Thus, the present invention provides a method and device for adjusting a demonstration pair of eyeglasses with a through the lens system attached thereto such that the particular customer can be custom fitted using the demonstration sliding bridge frame of the present invention, insuring that proper configurations and dimensions are recorded so as to produce the ultimate telescopic apparatus desired by such customer. A customer fitted with the invention of the present invention will then be able to appreciate exactly what their final product will be like and will not be surprised or disappointed when such final product is made and delivered. In such manner, the manufacturer and distributor of the telescopic apparatuses is benefitted in a reduction in customer dissatisfaction, returns, etc., thus benefitting the manufacturer/distributor's profits.

DETAILED DESCRIPTION OF THE PREFERRED EMBODIMENT

Figure 1:
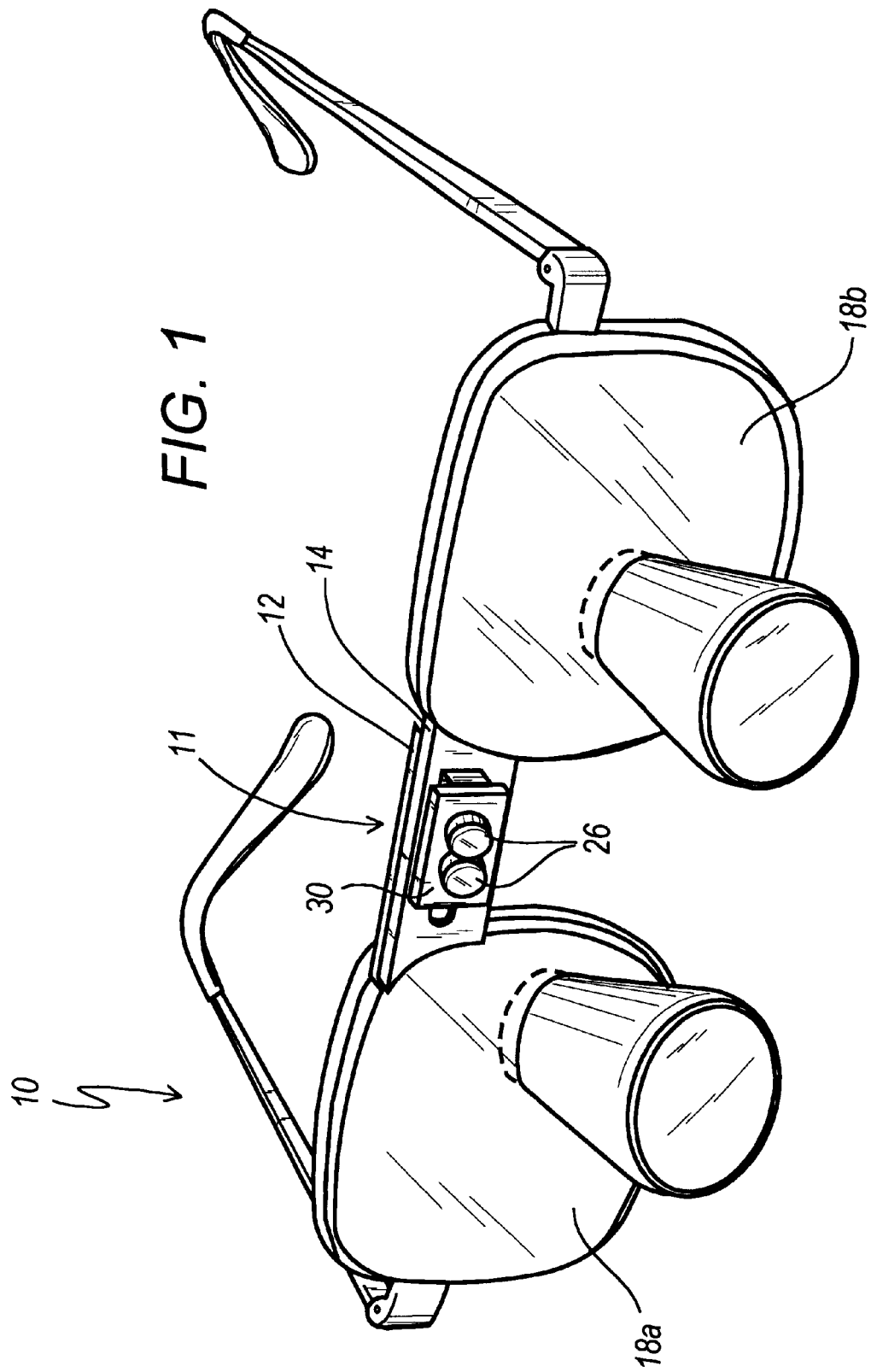
FIG. 1 is a perspective view of a sliding bridge demonstration frame employing first and second slidable engaging members.
Figure 2:
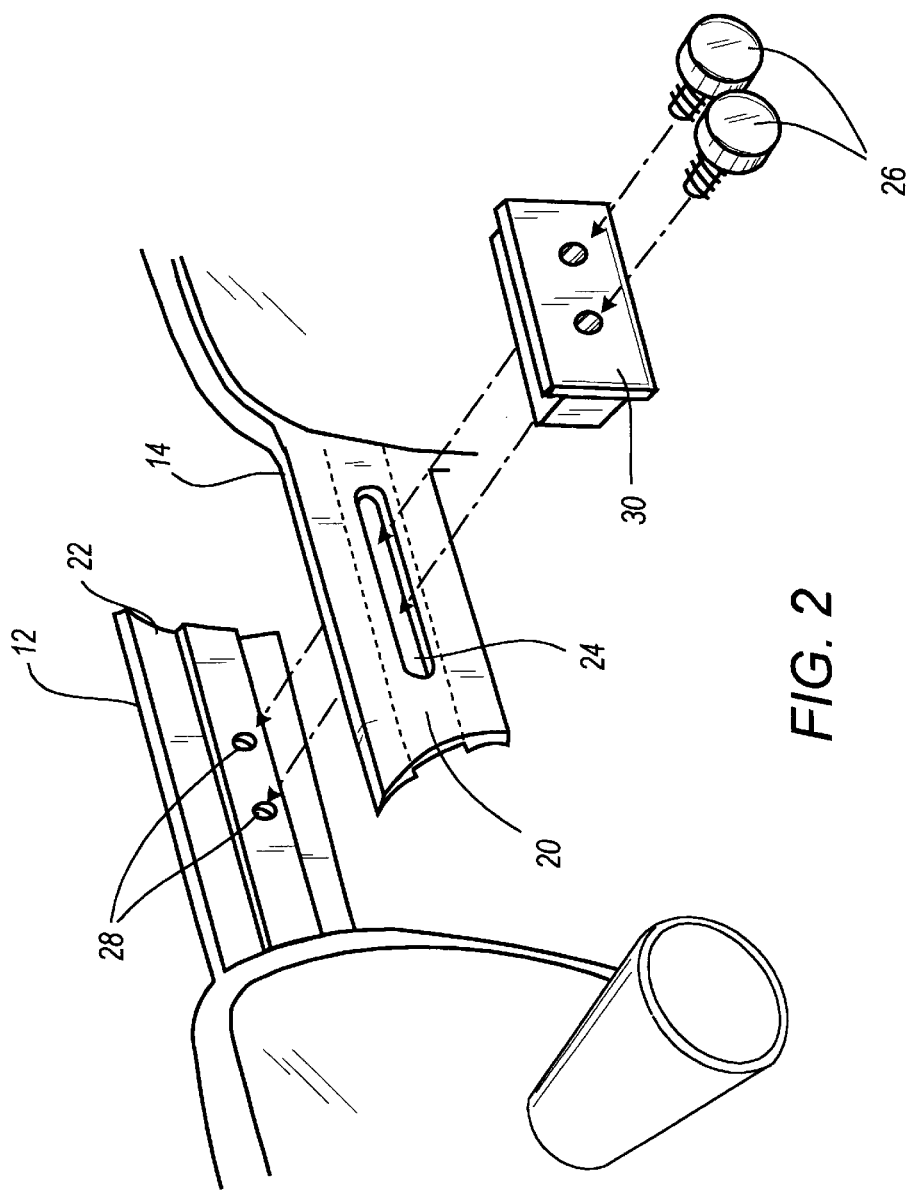
FIG. 2 is a perspective view of one portion of the present invention illustrating the mortise/tenon provided on the slidable engaging bridge members, as well as a bridge washer and connecting screws.
Figure 3:
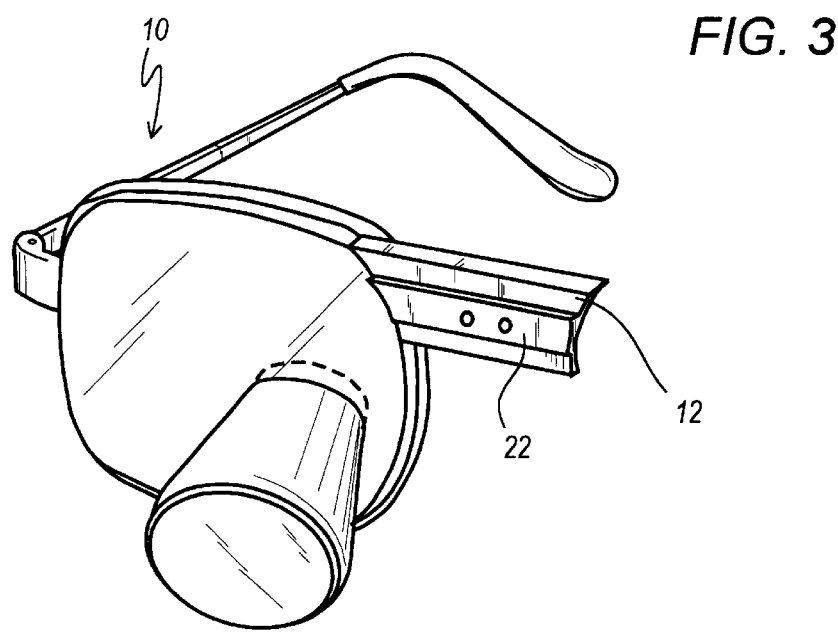
FIG. 3 is a perspective view of one sliding bridge member having a tenon and threaded apertures to receive a threaded screw.
Figure 4:
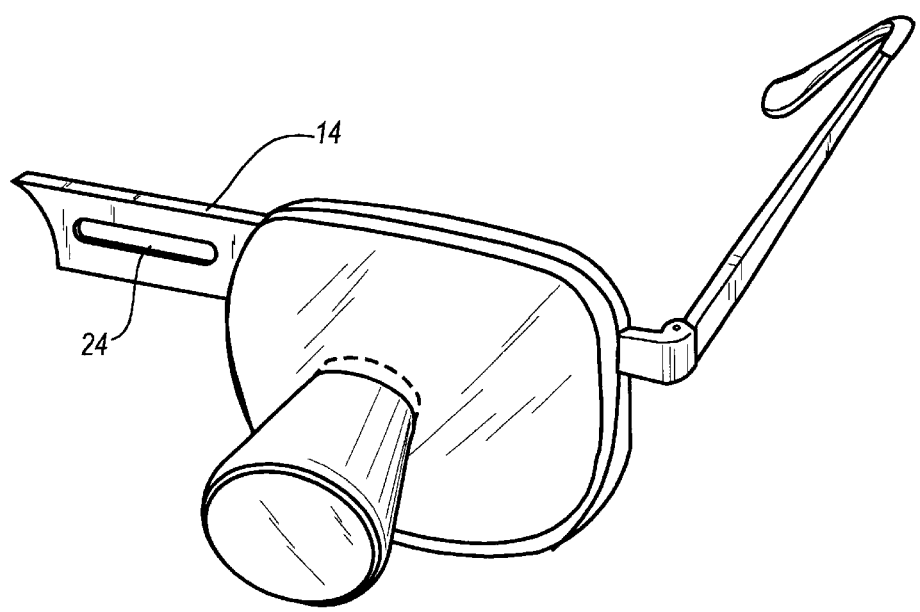
FIG. 4 is a perspective view of the counterpart sliding bridge member having a horizontal aperture extending therethrough.

In one embodiment of the present invention, the demonstration frame device 10 includes an adjustable sliding bridge 11 wherein a bridge is formed in two separate portions 12, 14, such portions being connectable and fixable at various positions within a plane. In this manner, the interpupillary distance between a particular persons eyes can be accommodated such that when the person views through the telescope oculars attached to the lenses of the eyeglasses, the person is able to perceive an accurate three dimensional depth of field representation of what their custom fitted lenses will be like. A means for slidably and fixedly engaging the two portions of an eyeglass bridge may comprise one or more threaded screw members 26 which, upon tightening, reversibly prevent and/or allow the bridge portions 12, 14 to move relative to one another. In a preferred embodiment, two separate lens eyeglass portions 18a, b have bridge members 12, 14 which are capable of interconnecting with each other in a slidable fashion. For example, in one particular embodiment, one bridge member is provided with horizontally extended mortise 20 capable of receiving the other bridge members tenon 22. With this mortise/tenon arrangement, the two bridge members 12, 14 can slidably interconnect with each other such that different interpupillary distances can be achieved merely by a sliding motion of the bridge members respective to themselves. Any means can be used to fix the bridge members to each other along their slidable paths. For example, in one embodiment, one bridge member 14 has a horizontally extending aperture 24 through which one or more screws 26 extend, such screws being received in round threaded apertures 28 in the other slidably engaging bridge member 12. In this fashion, when the screws 26 are loosened, the two bridge members 12, 14 can be slidably moved along a plane until an appropriate interpupillary distance is achieved. At such point, the screws 26 can then be tightened to prevent further slidable movement of the bridge members 12, 14. While only a single threaded screw 26 need be used to facilitate the reversibly fixed positioning of the two slidable bridge members 12, 14, the use of two spaced apart screw assemblies 26 further insures that the bridge members 12, 14 are properly positioned in a horizontal sliding relationship such that the mortise/tenon sliding engagement mechanism is utilized. As will be appreciated by those of skill in the art, the mortise/tenon relationship of the sliding bridge members provides for a more accurate horizontal sliding engagement of the two bridge members 12, 14, thus insuring that the precise positioning along the horizontal plane of the interpupillary distance is achieved.

In addition to the screwably attachable sliding bridge members 12, 14, in one embodiment of the present invention, a bridge washer housing 30 is provided through which the threaded screws 26 extend prior to extending through the first 14 and second 12 bridge members referenced above. The bridge washer 30 aligns with the horizontal aperture 24 and the threaded apertures 28 and the screws 26 extend therethrough to secure the bridge assembly 11. The bridge housing 30 adds to the stability of the overall fixed connection between the bridge members 12, 14 and further facilitates slidable adjustment of the two members with respect to themselves by providing stability and ease of rotation of the threaded members 26.

Once a particular individual's interpupillary distance is accommodated using the above-mentioned sliding bridge member assembly 11, and after the bridge members 12, 14 are fixedly attached to prevent further slidable engagement, the precise dimensions and configurations of the eyeglass/telemicroscopic ocular orientation can be measured to facilitate the production of a final customized lens frame for such particular customer.

With respect to the method of the present invention, a potential customer is seated in front of a salesperson who fits the apparatus of the present invention on the persons face as one would fit a pair of regular eye glasses on another. The potential customer is then asked to look through the ocular lenses attached to the eyeglass lenses and the sliding bridge frame 11 of the present invention is properly adjusted such that the interpupillary distance is determined through empirical fitting, relying upon the actual potential customer to determine when particular images are properly viewed through the ocular lenses. In this manner, there is little, if any, guess work with respect to meeting a customer's expectations with respect to the telemicroscopic device 10 and a decision as to whether to purchase such device 10 can be made in a prompt and expeditious manner. Moreover, the salesperson need not attempt to make measurements of interpupillary distance and then attempt to translate such measurements into an actual customized version of an eyeglass system for the particular customer, often taking several weeks, if not longer. Indeed, using the present method and apparatus, a salesperson of such fixed, through the lens ocular devices can custom fit a customer in a brief period of time and ensure that the customer is satisfied with the ocular characteristics of the device. Once the interpupillary distance is arrived at, the salesperson can then take precise measurements of the eyeglass frame dimensions and the location of the inter ocular lenses as positioned on the eyeglass frames such that the manufacturing process for such telemicroscopic lens system is simplified and expedited.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A sliding bridge frame for telemicroscopic eyeglasses, comprising:

a first eyeglass portion having an ocular lens operatively associated with an eyeglass lens, said first portion having a horizontally extending first bridge member;

a second eyeglass portion having an ocular lens operatively associated with an eyeglass lens, said second portion having a horizontally extending second bridge member;

a recess formed into said first bridge member and extending horizontally along said first bridge member, said recess configured to engage said second bridge member;

a projection formed into said second bridge member and extending horizontally along said second bridge member, said projection configured to be received within said recess for sliding engagement therewith; and a means for interconnecting said first and second bridge members such that said first and second bridge members can be slidably moved in a horizontal direction with respect to each other and reversibly fixed in a particular desired configuration.

2. The device as set forth in claim 1, wherein said interconnecting means comprises at least one threaded screw extending through a horizontal aperture provided in said first bridge member and received in a threaded round aperture in said second bridge member.

3. The device of claim 1, wherein said interconnecting means comprises structure configured to frictionally engage said first and second bridge members.

* * * * *